Patented May 8, 1951

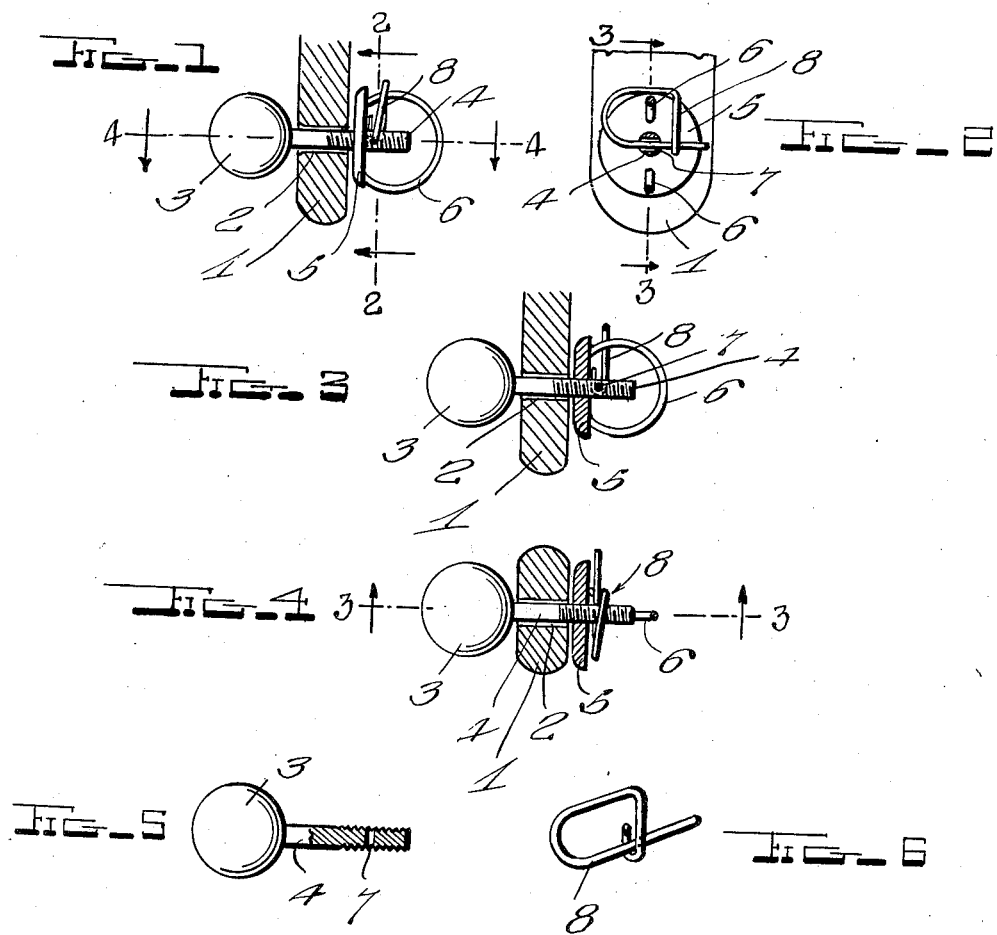

2,552,151

UNITED STATES PATENT OFFICE 2,552,151

LOSS PREVENTION DEVICE FOR EARRINGS

Esther Cohen, Washington, D. C.

Application March 6, 1946, Serial No. 652,266

1 Claim. (Cl. 63—12)

My invention relates to new and useful improvements in loss preventing or safety devices and more particularly to a loss preventative for earrings, the primary object being to provide a device that may be applied readily to earrings adapted for pierced ears to prevent the casual removal of the screw back and loss of the earring.

A further object resides in the provision of a safety pin or catch adapted to be inserted through the stem of the earring after the screw back has been applied to prevent the casual removal of the back.

A still further object resides in the provision of a simple, inexpensive and efficient device for carrying out the objects of the invention.

With these and other objects in view, my invention consists in the novel features of construction, combination and arrangement of parts, as will be hereinafter referred to and more particularly pointed out in the specification and claim.

In the accompanying drawing, forming a part of this application,

Figure 1 is side elevation of my device applied to an earring, the lobe of the ear being shown in section.

Figure 2 is a vertical section therethrough, as seen on the line 2—2 of Figure 1, Figure 3 is a similar view as seen on the line 3—3 of Figure 2, Figure 4 is a horizontal section, as seen on the line 4—4, of Figure 1, Figure 5 is an elevation, partly in section of the earring with back and safety device removed, Figure 6 is a perspective view of the safety pin removed, Figure 7 is an enlarged vertical section through an earring with a slightly modified form of safety device applied, and Figure 8 is an elevation of the modified form of safety device removed.

In describing the invention, I shall refer to the drawing in which similar reference characters designate corresponding parts throughout the several views and in which the numeral 1 designates the lobe of an ear pierced, as at 2, to receive therethrough the stem of an earring. It is a known fact that earrings which are applied to pierced ears usually have screw backs, which backs frequently are unscrewed by casual rubbing thereagainst, causing the loss of the earring. It is to prevent such loss that I have devised my new safety device.

I have shown in the drawing an earring of conventional type, having a head 3 and stem 4, the latter being threaded to receive thereon the screw back or nut 5. This nut may be of any shape, and provided with any form or shape of wing for turning purposes. In the drawing, I have shown the screw back or nut circular in design with a substantially circular wing 6, but it will be understood that the shape or design of this wing nut or screw back is immaterial.

The stem 4, which is adapted to be inserted through the opening 2 of the ear, is formed with an opening 7 extending completely therethrough, at a point beyond that covered by the lobe of the ear when the stem is passed therethrough. Through this opening 7 is adapted to be extended the arm of a safety pin or the like 8. This pin may take any shape, the idea being to provide a device that may be passed through the opening in the stem and secured to prevent the casual removal of the back from the stem of the earring. In the drawing, Figures 1 to 6, inclusive, I have shown a form of safety pin comprising a looped wire or the like, one arm of which, after passing through the opening in the stem, may be snapped into the loop of the other arm of the device, as clearly shown in Figure 6 of the drawing. However, I do not wish to be limited to any particular form of pin or catch for the purpose. The pin or catch shown in Figure 6 when applied to the stem of the earring with the screw back attached, will have one arm thereof extended through the opening 7 and the other arm thereof extended on the outside of the wing 6, as clearly shown in Figures 1, 2 and 3 of the drawing. Of course, it would be possible for this securing pin to extend through the circular wing and also be effective, but it appears to be more effective in the arrangement shown, and in view of the small size of the article to which it is applied, the pin can be more readily and quickly applied as disclosed in the drawing. As aforesaid, the wing on the nut or screw back 5 may be of any shape or form, and the pin when properly applied to the stem will be effective in preventing casual removal of the back or nut and corresponding loss of the earring.

In Figures 7 and 8 of the drawing, I have shown for convenience a modified form of pin or catch, wherein same takes the form of a split spring ring or the like, designated by the numeral 9. Obviously, same may be spread and inserted through the opening 10 of the stem 11, to retain the screw back 12 against casual removal.

From the foregoing description of the construction of my improved device, the method of applying same to use will be readily understood and it will be seen that I have provided a simple, inexpensive and efficient means for carrying out the objects of the invention.

While I have shown and described the elements best adapted to perform the functions set forth, it will be understood that various changes in form, proportion and in the minor details of construction may be resorted to, without departing from the spirit or sacrificing any of the principles of the invention.

Having thus described my invention, what I claim is:

In a device of the character described, a head, a shank extending from said head and threaded from its outer end, a nut screwed upon said shank, said shank being formed with a transverse opening disposed outwardly of the nut, an annular wing rigidly carried by said nut diametrically thereof and extending outwardly from the nut longitudinally of the shank and beyond the outer end of the shank and disposed in straddling relation to the portion of the shank between the nut and the outer end of the shank, and a fastener removably passed through the opening in the shank and disposed in overlapping relation to portions of the outer surface of the nut at opposite sides of the shank, said fastener having a looped portion disposed transversely of the shank and the wing in straddling relation to the wing and of less internal dimensions then the radius of the wing and prevented from tilting about the wing and the outer end of the shank by frictional binding engagement with the outer peripheral surface of the wing.

ESTHER COHEN.

REFERENCES CITED

The following references are of record in the file of this patent:

UNITED STATES PATENTS

| Number | Name | Date |
|---|---|---|
| 190,885 | McCray | May 15, 1877 |
| 256,063 | Smith | Apr. 4, 1882 |
| 1,985,809 | Timen et al. | Dec. 25, 1934 |
| 2,373,002 | Armstrong | Apr. 3, 1945 |

FOREIGN PATENTS

| Number | Country | Date |
|---|---|---|
| 31,470 | Austria | July 1, 1907 |
| 123,461 | Great Britain | Feb. 27, 1919 |